United States Patent
Hinker et al.

(10) Patent No.: US 6,351,845 B1
(45) Date of Patent: Feb. 26, 2002

(54) METHODS, APPARATUS, AND ARTICLES OF MANUFACTURE FOR ANALYZING MEMORY USE

(75) Inventors: Paul Hinker, Longmont; Shaun Dennie, Westminster, both of CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/244,894

(22) Filed: Feb. 4, 1999

(51) Int. Cl.$^7$ ................................................ G06F 9/45
(52) U.S. Cl. ......................................... 717/4; 711/100
(58) Field of Search ...................... 717/9, 4, 8; 711/100

(56) References Cited

U.S. PATENT DOCUMENTS

| | | | | |
|---|---|---|---|---|
| 5,613,063 A | * | 3/1997 | Eustace et al. | 714/38 |
| 5,689,712 A | * | 11/1997 | Heisch | 395/704 |
| 5,787,480 A | * | 7/1998 | Scales et al. | 711/148 |
| 5,905,488 A | * | 5/1999 | Demers et al. | 345/173 |
| 5,974,536 A | * | 10/1999 | Richardson | 712/215 |
| 6,018,793 A | * | 1/2000 | Rao | 711/150 |
| 6,085,029 A | * | 7/2000 | Kolawa et al. | 395/183.14 |

OTHER PUBLICATIONS

Ian Foster, *Designing and Building Parallel Programs,* Addison–Wesley Publishing Company, 1995.
Barry Wilkinson and Michael Allen, *Parallel Programming,* Prentice–Hall, 1999.
David E. Culler and Jaswinder Pal Singh, *Parallel Computer Architecture,* Morgan Kaufman Publishers, Inc., 1999.
Sun Microsystems Computer Company, *Prism 5.0 Reference Manual,* Revision A., Nov. 1997.
"Purify for Windows NT, Product Overview," Ver. 6.0, available online at: www.rational.com/products/purify nt/index.jtmpl as of Jan. 11, 1999, 4 pages.
GeoMAMOS Project Home Page, available online at: www.ece.nwu.edu/~theory/geomamos.html as of Jun. 10, 1999, 4 pages.
"Introduction," available online at: www.ece.nwu.edu/theory/gs tech 1 html/section3 1.html as of Jun. 10, 1999, 2 pages.
"Visualization for Developing Geometric Algorithms," available online at: www.ece.nwu.edu/~theory/gs_tech_1_html/section3 3.html as of Jun. 10, 1999, 2 pages.
"Algorithm Visualization System: Introduction," available online at: www.cp.eng.chula.ac.th/faculty/spi/research/avis/intro.html as of Jun. 10, 1999, 2 pages.
"Scientific Simulations and Algorithm Visualizations Using NESL and Java," available online at: www.cs.cmu/edu/scandal/applets/ as of Jun. 10, 1999, 1 page.

\* cited by examiner

*Primary Examiner*—Mark R. Powell
*Assistant Examiner*—Wei Zhen
(74) *Attorney, Agent, or Firm*—Finnegan, Henderson, Farabow, Garrett & Dunner, L.L.P.

(57) ABSTRACT

Methods, systems, and articles of manufacture consistent with the present invention assist a programmer in the optimization of an application program by displaying information about memory use in a manner useful to the programmer. A programmer selects an application program that he wishes to optimize. The application program is submitted to an instrumentation process that inserts additional instructions into the code of the application program so that, when executed, the instrumented code produces an output file, called a trace output file. The trace output file contains information about memory accesses. The trace output file is then submitted to a second program, or visualizer, that visually displays the memory accesses using a different visual effect for each type of memory access operation. The visualizer may be run at different speeds, forwards or backwards, paused, or may step through the memory accesses frame-by-frame. This visual representation of memory accesses allows programmers to recognize patterns of memory use that can be used to optimize the application program.

18 Claims, 8 Drawing Sheets

```
402         program Algo Example
404         implicit none
406         INTEGER Size, I, J
408         PARAMETER (Size = 4)
410         INTEGER A(Size,Size), B(Size, Size)

432         DO J = 2, Size - 1
434            DO I = 2, Size - 1

452               B(I,J) = (A(I-1,J)+A(I,J)+A(I+1,J)+A(I,J-1)+A(I,J+1))/5.0
454            END DO
456         END DO

460         DO J = 1, Size
462            DO I = 1, Size

472               A(I,J) = B(I,J)
474            END DO
476         END DO
478         END
```

FIG. 4

| | | |
|---|---|---|
| | 402 | program Algo Example |
| | 404 | implicit none |
| | 406 | INTEGER Size, I, J |
| | 408 | PARAMETER (Size = 4) |
| | 410 | INTEGER A(Size,Size), B(Size, Size) |
| 512 | | C-- Added Declarations |
| 514 | | INTEGER ADims(2), BDims(2) |
| 516 | | DATA ADims /Size, Size/ |
| 518 | | DATA BDims /Size, Size/ |
| 520 | | C-- End of Added Declarations |
| 522 | | C-- Added Initialization |
| 524 | | CALL INIT_ENVIRON(%val(2), "Stencil.Out") |
| 526 | | CALL CREATE_OBJECT("A", A, %val(2), %val(4), ADims) |
| 528 | | CALL CREATE_OBJECT("B", B, %val(2), %val(4), BDims) |
| 530 | | C-- End of Added Initialization |
| | 432 | DO J = 2, Size - 1 |
| | 434 | DO I = 2, Size - 1 |
| 536 | | C-- Added Log Update |
| 538 | | CALL LOG_EVENT(%val(0), A(I-1,J), "5 Pt Stencil") |
| 540 | | CALL LOG_EVENT(%val(0), A(I+1,J), "5 Pt Stencil") |
| 542 | | CALL LOG_EVENT(%val(0), A(I,J), "5 Pt Stencil") |
| 544 | | CALL LOG_EVENT(%val(0), A(I,J+1), "5 Pt Stencil") |
| 546 | | CALL LOG_EVENT(%val(0), A(I,J-1), "5 Pt Stencil") |
| 548 | | CALL LOG_EVENT(%val(1), B(I,J), "5 Pt Stencil") |
| 550 | | C-- End of Added Log Update |
| | 452 | B(I,J) = (A(I-1,J)+A(I,J)+A(I+1,J)+A(I,J-1)+A(I,J+1))/5.0 |
| | 454 | END DO |
| | 456 | END DO |
| | 460 | DO J = 1, Size |
| | 462 | DO I = 1, Size |
| 564 | | C-- Added Log Update |
| 566 | | CALL LOG_EVENT(%val(0), B(I,J), "Matrix Copy") |
| 568 | | CALL LOG_EVENT(%val(1), A(I,J), "Matrix Copy") |
| 570 | | C-- End of Added Log Update |
| | 472 | A(I,J) = B(I,J) |
| | 474 | END DO |
| | 476 | END DO |
| | 478 | END |

FIG. 5

602 CREATE A 159288 2 4 4 4
604 CREATE B 159360 2 4 4 4
606 REGISTER 33 5 Pt Stencil
608 REGISTER 34 Matrix Copy
610 RW 0 159304 33
612 RW 0 159312 33
614 RW 0 159308 33
616 RW 0 159324 33
618 RW 0 159292 33
620 RW 1 159380 33
622 RW 0 159308 33
624 RW 0 159316 33
626 RW 0 159312 33
628 RW 0 159328 33
630 RW 0 159296 33

METHODS, APPARATUS, AND ARTICLES OF MANUFACTURE FOR ANALYZING MEMORY USE

BACKGROUND OF THE INVENTION

A. Field of the Invention

This invention relates generally to methods for optimizing performance of computer programs and, more particularly, to methods for analyzing memory use in optimizing performance of computer programs.

B. Description of the Related Art

Computer programmers are continuously searching for ways to make application programs run faster and more efficiently. The performance time of an application may be minimized by reducing the time needed to execute each operation. Many application programs today, however, involve thousands of lines of code and millions of operations thereby making optimization of code a difficult process.

Almost each operation in an application program involves the memory of a computer in some capacity. Memory is "read" when an instruction in the application looks at (and generally uses) the contents of some area of memory without alteration. A "write" to memory takes place when an instruction of the program stores information in an area of memory, overwriting what, if anything, was previously stored in that memory location. Memory accesses may be either "reads" or "writes" to memory. Since a large number of operations of an application program involve accessing memory, performance may be improved by reducing the number of memory accesses performed by an application program.

One important step in optimizing an application program is to understand how the memory of the computer is allocated and how the memory is accessed during operation of the program. Conventionally, programmers study how the application works by, for example, inserting "print" instructions in the program that when executed, output the contents of memory at various points in the program operation, as process known as "instrumentation." This conventional method produces lengthy printouts of memory accesses that require close further analysis by a programmer and patterns of memory use are not easily detected. Programmers also frequently resort to a painstaking process of hand drawing representations of memory to aid the programmer in visually tracing memory accesses.

Multiple parallel processors may be used to improve the execution time of application programs. Application programs for a multiprocessor environment, however, are complicated to debug and optimize. To write new or modify existing application programs for use on multiple parallel processors, programmers must have a clear understanding of how each operation in a program interacts with memory and which specific memory elements are accessed. By determining where in a program the number of reads and writes is concentrated, programmers can identify portions of application code that need to be optimized. The execution time of these sections of program code with a high number of memory accesses may then be improved, for example, by replacing the section with optimized code or using a special purpose hardware device.

Another method for optimizing application programs is to identify and exploit data dependencies. Data dependencies arise when one computation requires the result of a previous computation. In multiplying two matrices, for example, items in the matrices are multiplied, then those results are summed. To arrive at the correct result, the sum must be performed after the multiplication. Program code that performs a matrix multiplication, will access some memory elements repeatedly. When a matrix multiplication is programmed for parallel processors, programmers must determine when certain memory elements are read for the last time, so that when the program writes to that matrix entry, no matrix information is lost.

There exist hardware and software devices that track accesses to particular memory elements. These devices, however, do not identify whether the particular access is a "read" or a "write." Furthermore, these conventional devices do not track data dependencies.

There exist also conventional tools that check for memory errors during execution of an application program. Purify™ from Pure Software Inc. and Insure++™ from ParaSoft Corporation are examples of tools that will perform run time memory checks for programs written in the C and C++ programming languages. These conventional tools help detect run-time memory errors arising from improper memory accesses, such as reading or writing beyond the bounds of an array, reading or writing to freed memory, freeing memory multiple times, reading and using uninitialised memory, and forgetting to free memory (called "memory leaks") once a program has terminated. These tools, however, produce lengthy printouts that need further analysis by a programmer. Furthermore, conventional tools, like Purify and Insure++, notify the programmer only when these error conditions occur. Additionally, conventional memory-usage analysis tools do not use visual displays to track use of individual memory areas.

Conventional tools used to debug application programs may visually display regions of memory using various colors depending on the value in the memory element. Debugging tools are used to identify and correct errors that occur during execution of an application program. These conventional visual debugging tools are useful for analyzing how values in memory change as an application program executes, but do not show when memory is accessed but not changed. For example, it does not show "reads" because during reads the value stored in memory is not changed. Furthermore, debugging tools typically do not show the frequency that a particular memory element is accessed.

Some compiler optimizers do data flow analysis when compiling application programs. Optimization by compiler optimizers, however, is performed at a basic block level and not generally performed for an entire program. Furthermore, compiler optimizers guess at data dependencies merely by looking at the source code of a program, not by running the code. Some data dependencies, however, are not detectable until runtime. Some sophisticated models may make good approximations, but these are still approximations versus actual accesses.

Furthermore, some data dependencies are not always obvious to a compiler that looks only at the source code. For example, in the expression A(I)=A(I)+A(I+1), the data dependency between the last two terms will be recognized by many conventional compilers. However, the following example shows a set of instructions with a data dependency that would not be obvious to most conventional compilers.

Do J=1,10
I=B(j)

A(I)=A(I)+A((B(J+1))
Enddo

This program code adds the $i^{th}$ element of array A to another array element, which is determined by B(J+1). If B is an array of independent, unrelated values, the relationship between the last two terms is not easily determined at the time when the instructions are compiled.

Therefore, a need exists for an improved method of optimizing programs by analyzing memory accesses. Furthermore, a need exists for a method of analyzing memory accesses that identifies data dependencies and displaying this information in a manner useful for a programmer.

SUMMARY OF THE INVENTION

Systems, methods, and articles of manufacture consistent with the present invention track accesses to memory during execution of an application program. Additional instructions are inserted into the application program and the instrumented application program is executed. During execution of the instrumented application program, information reflecting different types of memory access operations is generated. This generated information is displayed in a visual form reflecting the different types of memory access operations using a different visual effect for each type of memory access operation.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Reference will now be made in detail to an implementation consistent with the principles of the present invention as illustrated in the accompanying drawings. Wherever possible, the same reference numbers will be used throughout the drawings and the following description to refer to the same or like parts.

A. Introduction

Methods, systems, and articles of manufacture consistent with the present invention assist a programmer in the optimization of an application program by displaying information about memory use in a manner useful to the programmer. A programmer selects an application program that he wishes to optimize. The application program is submitted to an instrumentation process that inserts additional instructions into the code of the application program so that, when executed, the instrumented code produces an output file, called a trace file. The trace file contains information about memory accesses. The trace file is then submitted to a second program, which may be referred to as a visualizer, that visually displays the memory accesses using a different visual effect for each type of memory access operation. The visualizer may be run at different speeds, forwards or backwards, paused, or may step through the memory accesses frame-by-frame. This visual representation of memory accesses allows programmers to recognize patterns of memory use that can be used to optimize the application program.

B. Systems and Apparatus

Figure 1:
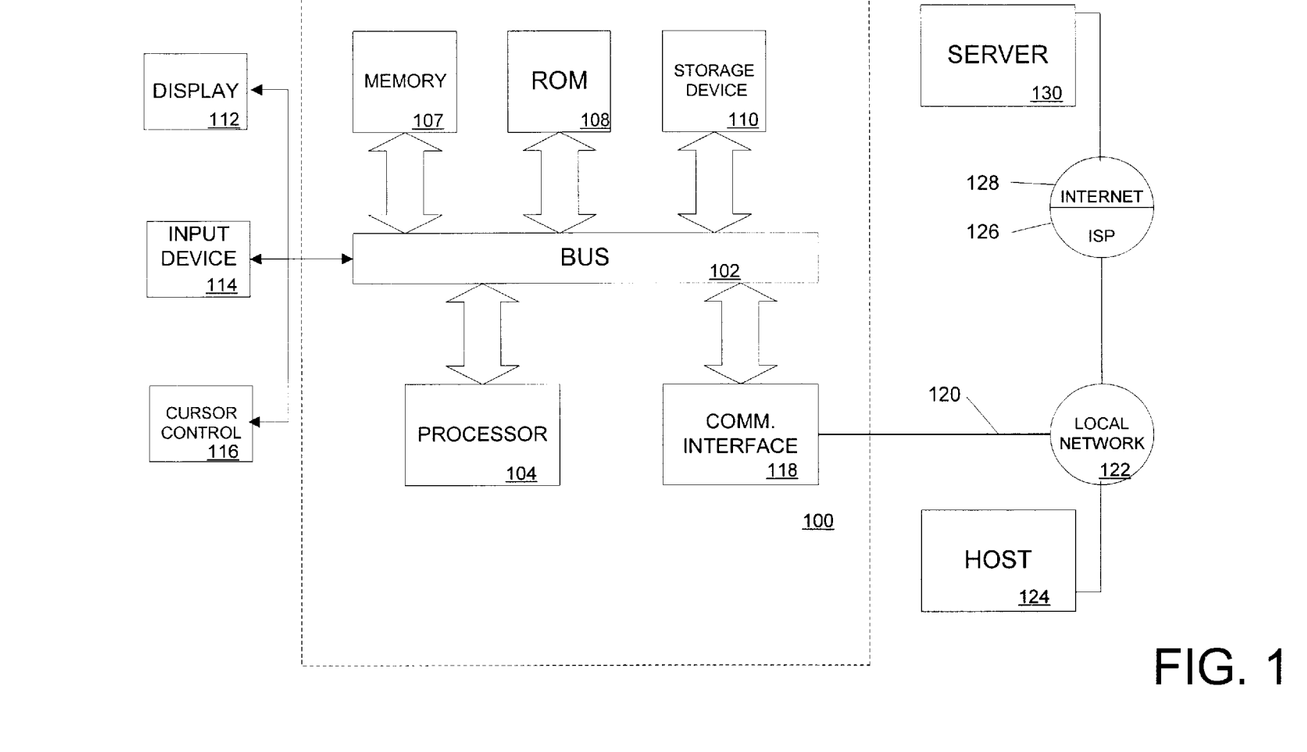
FIG. 1 shows a block diagram of an exemplary system in which methods consistent with the present invention may be implemented.

FIG. 1 is a block diagram that illustrates a data processing system 100 upon which embodiments of the invention may be implemented. System 100 includes a bus 102 or other communication mechanism for communicating information, and a processor 104 coupled with bus 102 for processing information. System 100 also includes a memory 106, which can be a random access memory (RAM) or other dynamic storage device, coupled to bus 102 for storing information, such as memory access information or instructions to be executed by processor 104. Memory 106 also may be used for storing temporary variables or other intermediate information during execution of instructions to be executed by processor 104. System 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

System 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

In accordance with the principles of the present invention, system 100 may be used for analyzing accesses to memory. Consistent with one implementation of the invention, information from the multiple remote resources, such as memory access information, is provided by system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process states described herein. In an alternative implementation, hard-wired circuitry may be used in place of or in combination with software instructions to implement the invention. Thus implementations of the invention are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave, or any other medium from which a computer can read.

Various forms of computer readable media may be involved in carrying one or more sequences of one or more instructions to processor 104 for execution. For example, the instructions may initially be carried on magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

System 100 also includes a communication interface 118 coupled to bus 102. Communication interface 118 provides a two-way data communication coupling to a network link 120 that is connected to local network 122. For example, communication interface 118 may be an integrated services digital network (ISDN) card, a cable modem, or a modem to provide a data communication connection to a corresponding type of telephone line. As another example, communication interface 118 may be a local area network (LAN) card provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 and/or to data equipment operated by an Internet Service Provider (ISP) 126. ISP 126 in turn provides data communication services through the Internet 128. Local network 122 and Internet 128 both use electric, electromagnetic, or optical signals that carry digital data streams. The signals through the various networks and the signals on network link 120 and through communication interface 118, which carry the digital data to and from computer system 100, are exemplary forms of carrier waves transporting the information.

System 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the present invention, one such downloaded application allows a user to select security countermeasures and countermeasure strength levels, as described herein. The received code may be executed by processor 104 as it is received, and/or stored in storage device 110, or other non-volatile storage for later execution. In this manner, system 100 may obtain application code in the form of a carrier wave.

Although system 100 is shown in FIG. 1 as being connectable to one server, 130, those skilled in the art will recognize that system 100 may establish connections to multiple servers on Internet 128. Additionally, it is possible to implement methods consistent with the principles of the present invention on other device comprising at least a processor, memory, and a display, such as a personal digital assistant.

Figure 2:
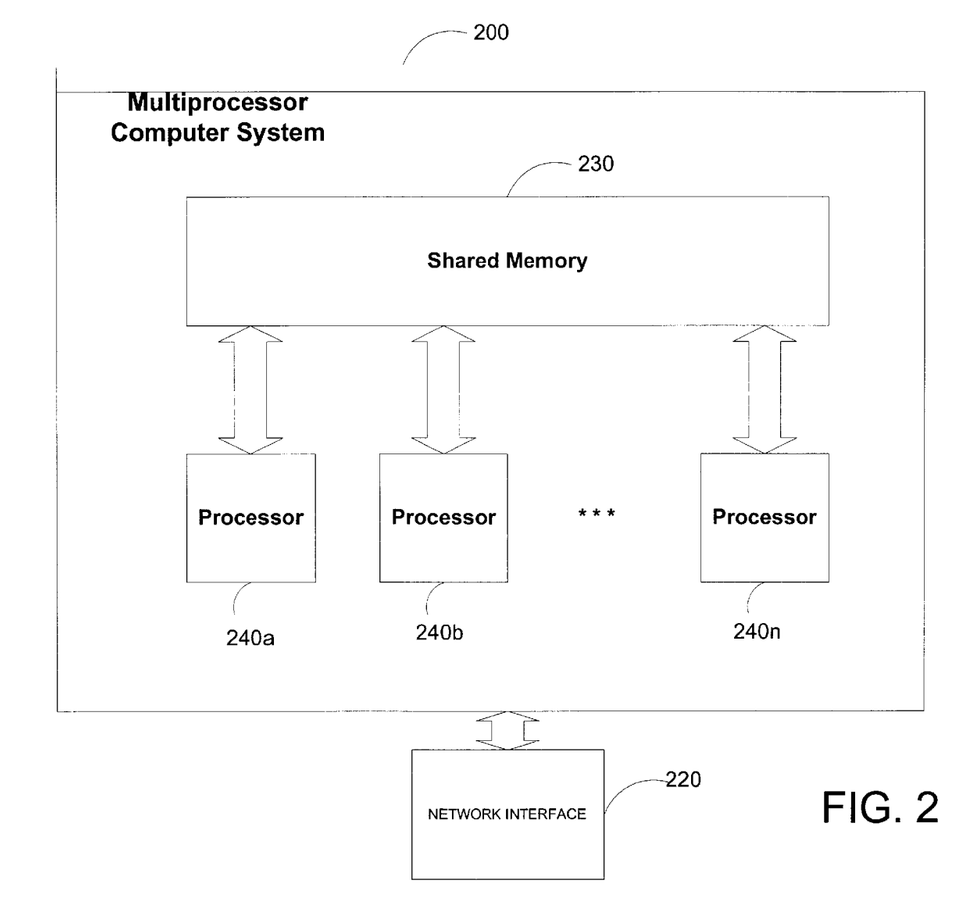
FIG. 2 shows a block diagram of an exemplary multiprocessor computer system in which application programs written in a manner consistent with the present invention may be implemented.

It is further possible to implement methods consistent with the principles consistent with the present invention in a multiprocessor environment. There are many configurations for such a multiprocessor computer system, one of which is illustrated in FIG. 2. For example, in a tightly-coupled configuration, the multiple processors of a system may all be located in the same physical box. In an alternative, loosely-coupled arrangement the system may be formed by multiple computers in a network, each computer having a separate processor.

FIG. 2 is a block diagram of multiprocessor computer system 200 with which methods consistent with the present invention may be implemented. Multiprocessor computer system 200 comprises a single, shared memory 230 and multiple processors 240a, 240b, . . . 240n. The number and type of processors is not critical to execution of the data flow program developed in accordance with the present invention. For example, an HPC Server with a multiple processor configuration may be used. The HPC Server is a product of Sun Microsystems, Inc. Processors $230_a$ through $230_n$ represent processors that communicated with shared memory 210. Processors 230a through 230n may be, for example, stand-alone computers, a collection of processors contained on a either a computer or processor board, or a combination. Each of processors 230a through 230n may be, for example, a system 100 as described above and shown in FIG. 1. As shown in FIG. 2, multiprocessor computer system 200 is connected to a network interface 820 for transmitting and receiving data, including memory access information, across a network.

Shared memory 230 may correspond to a portion of memory designated for use by several processors, or alternatively it may represent a local cache of a single processor that cooperates with other processors. This shared memory may be either a virtual or a global region of main memory.

C. Process

Figure 3:
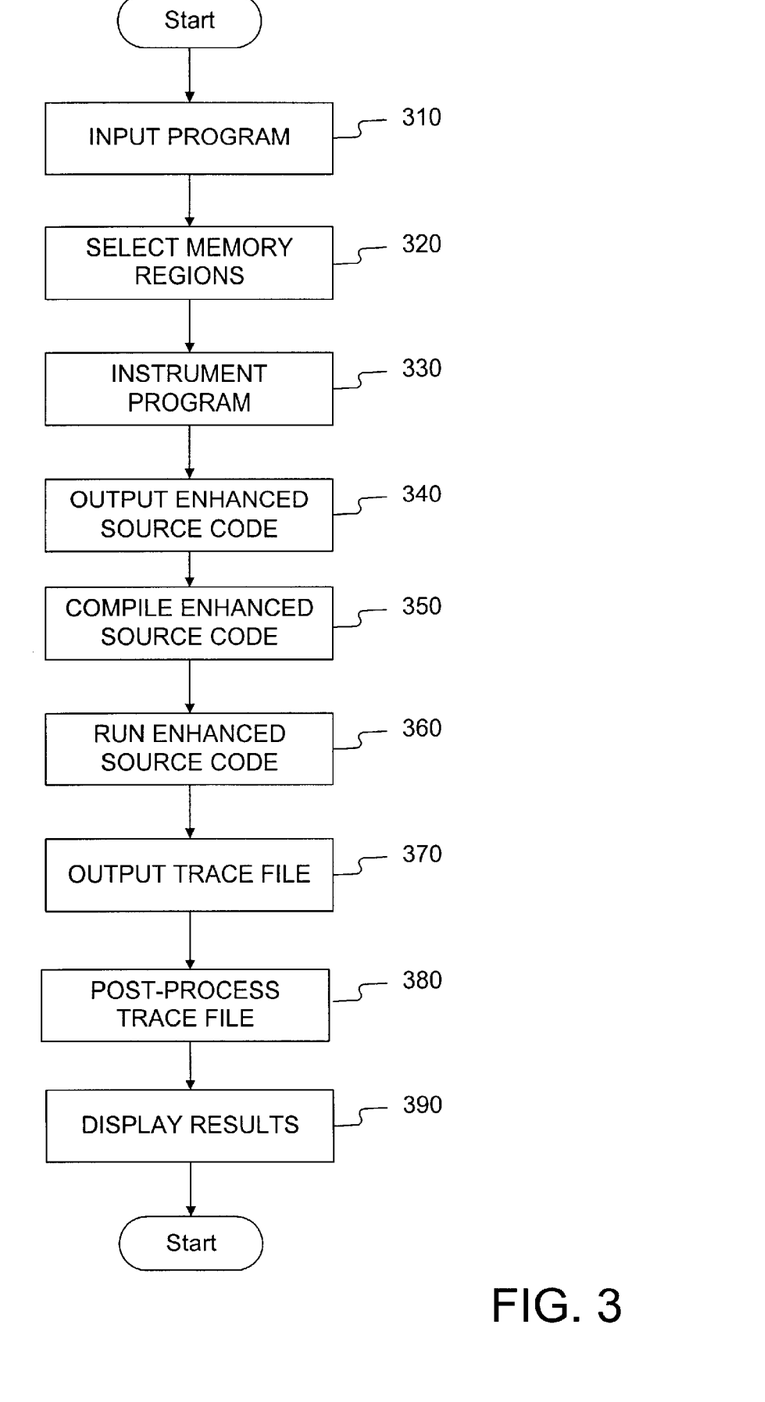
FIG. 3 is a flow diagram representing operations of a method consistent with the present invention.
Figure 4:
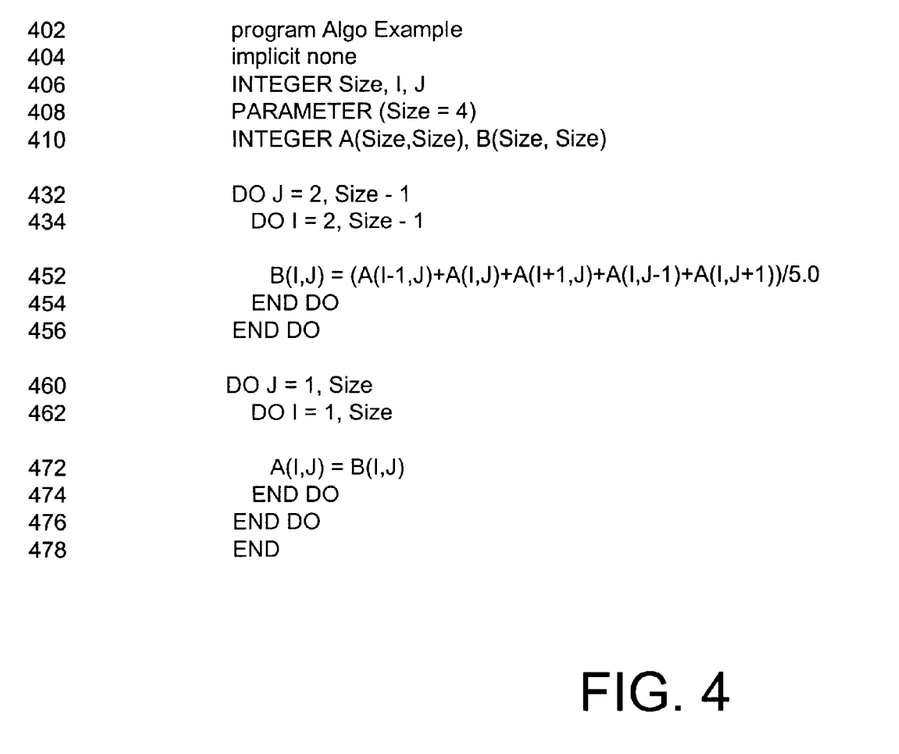
FIG. 4 is an example of an application program.

FIG. 3 is a flow chart illustrating the operations of a process for analyzing memory use consistent with the present invention. Consistent with the present invention, the method begins by inputting or obtaining an application program to be optimized (step 310). The application program may be input to the computer from a disk via a disk drive or received over a network connection. The application program may also be obtained from storage resident on the computer. FIG. 4 shows an example of an application program that computes an average of five elements of matrix A and stores the result in an element of matrix B (lines 432–456). In the second subroutine, matrix B is copied to matrix A (lines 460–476).

Next, memory regions of interest are selected (step 320). A memory region may be a specific memory address or a set of memory addresses. Memory regions may be selected, for example, by a user manipulating a user interface to indicate a subset of memory regions from a set of available memory regions. The method may also proceed without selection by operating on all available memory regions.

In step 330, the program is instrumented to include code for creating an output file. Instrumentation involves adding statements and commands to the source code which, when executed, will produce an output file. In one example, the commands call a set of routines in, for example, a library, and they are used to record the memory information. The library may contain, for example, functions for initializing the environment, creating objects, logging events, and registering states. Initialization statements and declarations, for example, may be added to the source code to set up the data structures needed to initialize the library so that it can accept access entries. The majority of statements added to the source code will be Log Update type entries, since every memory access for a monitored region that was selected in step 320 requires a call to the library to record the event. Instrumented source code is output to a file (step 340).

Figure 5:
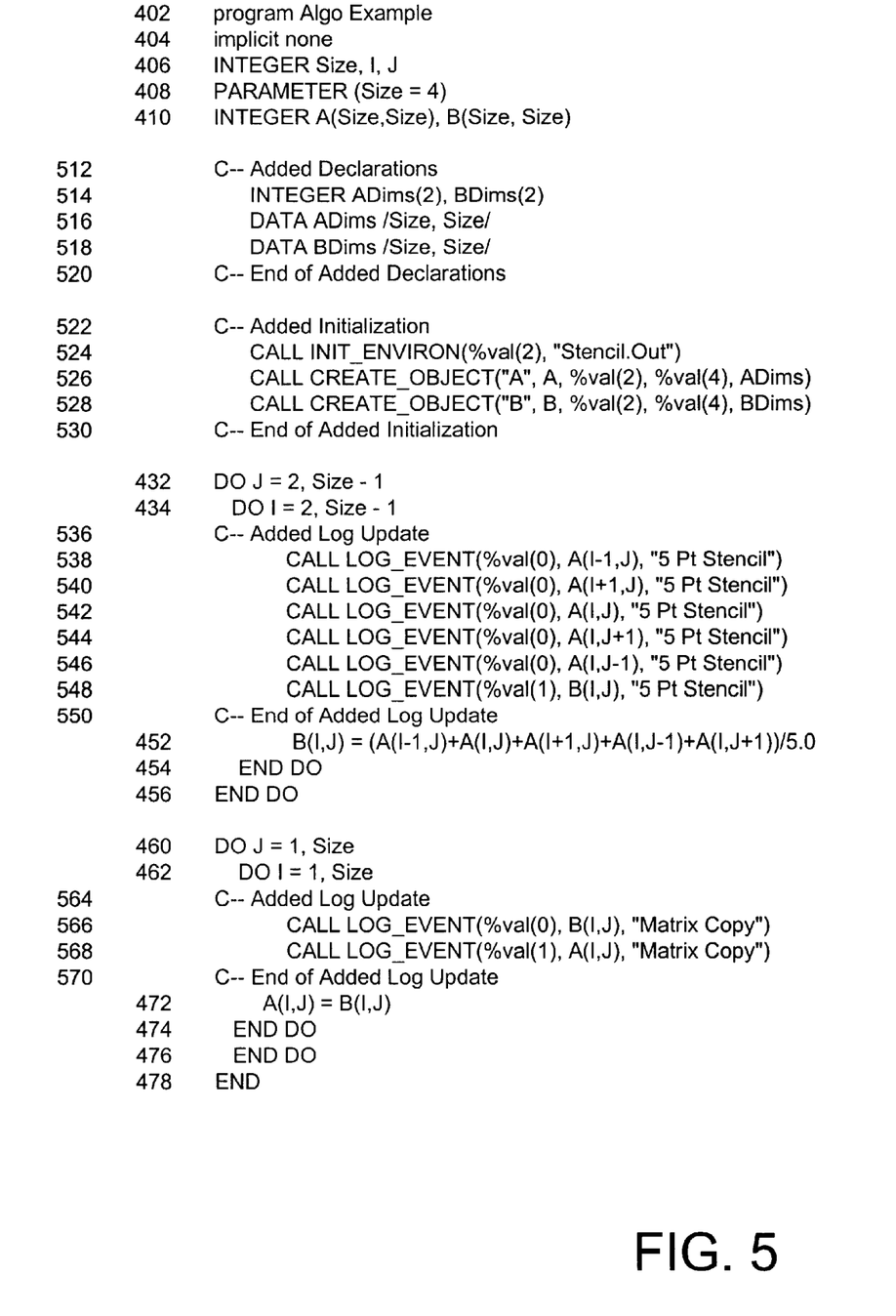
FIG. 5 is an example of an instrumented application program based on the application program of FIG. 4, consistent with the present invention.

FIG. 5 shows the application program of FIG. 4 after instrumentation. Lines 512 through 520 have been added to initialize variables that will be used later in the instrumented program. Lines 522 through 530 call routines that perform additional initializations. Lines 536 through 550 and lines 564 through 570 have been added to call routines that log information about memory accesses during the two loops.

Figure 6:
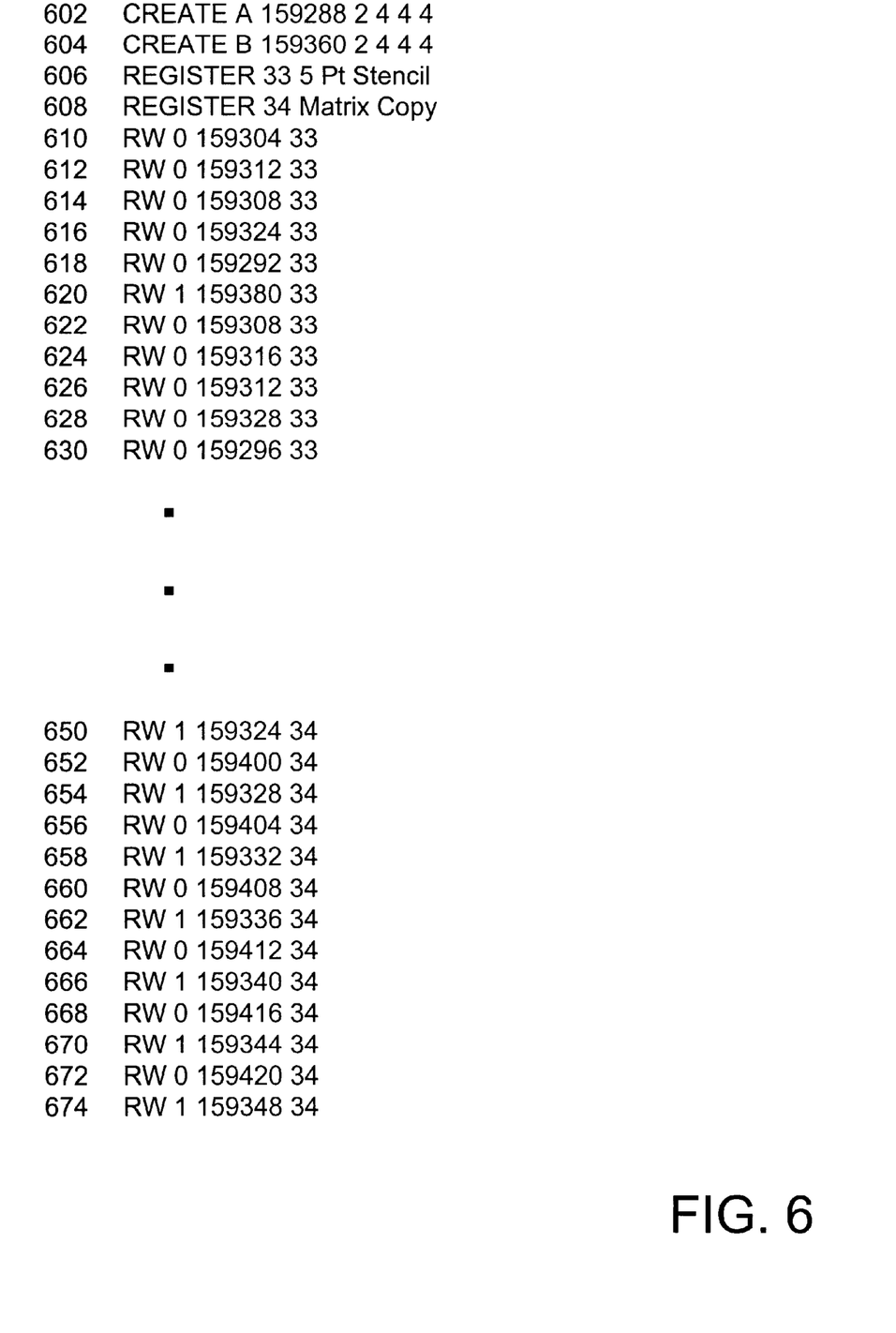
FIG. 6 is an example of the output generated by the modifications included in the program of FIG. 5, consistent with the present invention.

After the application sources files have been instrumented, the instrumented source code is compiled (step 350) and run normally (step 360). Execution of the instrumented source code will produce a trace output file that describes the memory accesses that occur during execution of the application program (step 370). An example of a trace output file consistent with the present invention is shown in FIG. 6. Line 602 of the trace output file states: "CREATE A 159288 2 4 4 4" and indicates that a monitored memory region is being created and it is named "A." Memory region A starts at memory address 159288 and is a two-(2) dimensional region. Each two-dimensional region has a size of four (4) bytes, and the region is made up of four (4) elements along the x-axis and four (4) elements along the y-axis. This information allows the program to track the region that is being accessed simply by the address in memory. An additional side benefit of memory access tracking in this manner is that out-of-bounds accesses are immediately discovered and reported.

Lines 606 and 608 of the trace output file initialize two states of the algorithm called "Pt Stencil" and "Matrix Copy." On line 606, the state "Pt Stencil" is assigned the number 33. On line 608, the state "Matrix Copy" is assigned the number 34. Lines 610 through 684 in the trace output file are a listing of the memory accesses and other memory access information. Column 1, for example, contains information describing the size of the memory area accessed. In FIG. 6, the entry "RW" indicates a single access to one memory region. Other indicators may indicate, for example, multiple accesses to a regional of memory, such as to a vector, matrix, or three-dimensional volume of memory areas.

Column 2 in FIG. 6 contains an indicator corresponding to whether the access was a read (0) or a write (1). This column may also indicate, for example, last write (2), last read (3) or other such information. Column 3 shows the starting address of the memory that was accessed. As shown on line 610 of FIG. 6, for example, the first memory address accessed is memory address "159304".

The fourth column is an integer referring to the state from which the current access originated. During the instrumentation process, the first loop was assigned the name "Pt Stencil" and the value 33. As shown in lines 610 through 630, the last column indicates the memory access described on this line was executed during state 33, or during "Pt Stencil."

In step 380, the outputted trace file is post-processed to display the information contained in the trace file visually on a display device. In post-processing, the access trace file may be, for example, fed into a visualizer that conditions the data for display. Since the memory access information is stored in a trace output file, instead of being displayed in real-time as the instrumented application executed, display of the information is more flexible and more adaptable to the programmer's needs. The visualizer, for example, may display the contents of the trace output file forward, backward, faster, slower, by time step, or by state transition.

Figure 7:
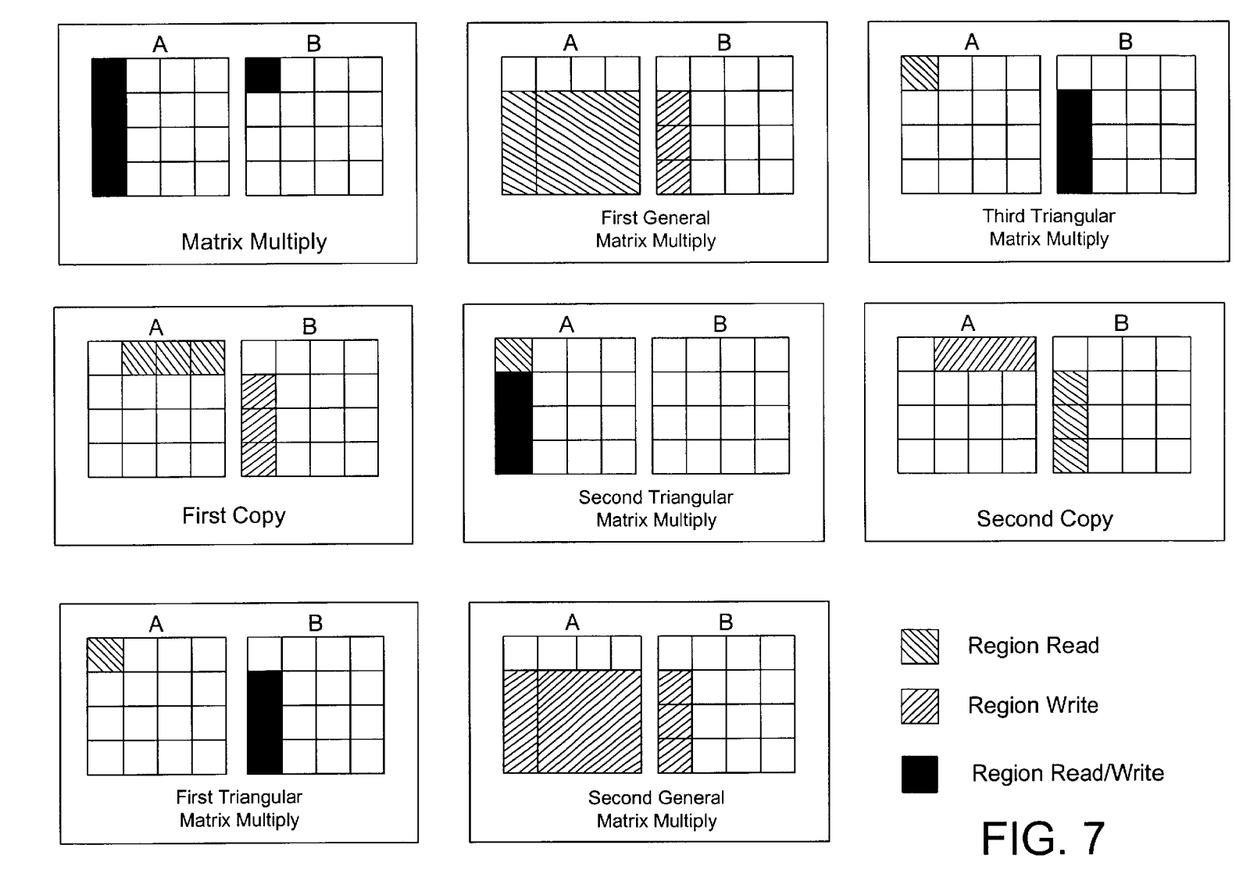
FIG. 7 is an example of a graphical display showing the a trace file of a matrix factorization program consistent with the present invention.

The results of post-processing are displayed visually (step 390). FIG. 7 is an example of eight snapshots of a visual display consistent with the present invention. The diagrams in FIG. 7 display exemplary memory region accesses that occur during various stages of a matrix factorization algorithm. Each of the matrices represents a different memory region. The memory region on the left may, for example, represent the elements of matrix A; the memory region on the right represents the elements of matrix B. Each set of two matrices represents the memory regions during different stages of the algorithm. As indicated by the key, regions that are being read are displayed using one visual means. A visual means may be a pattern, shape, color or combination thereof. Memories elements that are being written to are displayed using a second visual means. Each time one of the interested memory regions is read or written to, the visual means of display for that element changes. For example, if different colors are used to represent difference memory access types, a read may the entry red and a write may then turn the block green. A third visual means, such as the solid (completely filled) blocks in FIG. 7, may indicate that a memory element was written to and read in the same step.

The trace output file may also be used to display, for example, the last time that the algorithm wrote to a particular element. The visualizer program will, for example, examine the trace output file from the end and code the last write to be displayed in a different pattern or color (i.e. light blue). The "last write" information is particularly useful in developing software for parallel processors. By examining the display shown in FIG. 7, for example, the programmer will recognize that a lot of computations are done in the first column of the "B" matrix, so these calculations may be optimized using parallel processing. If so, it is important to know when the last write occurs for each memory element, because it indicates that the contents may then be made available for the next calculation.

Figure 8:
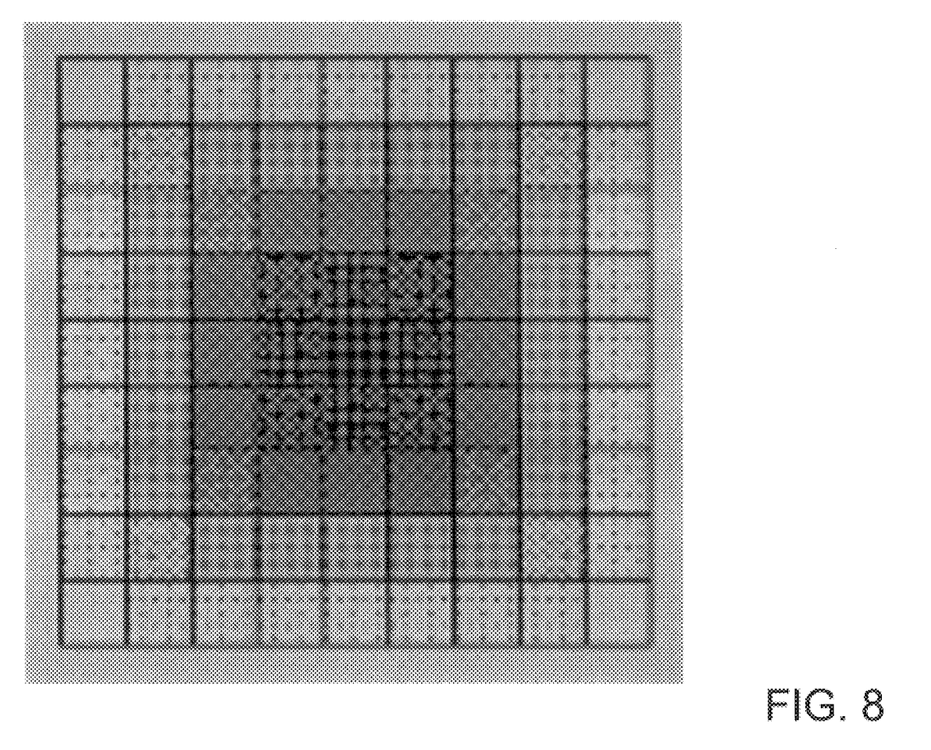
FIG. 8 is an example of a graphical display using a histogram.

The trace output file may also be used to display the frequency of accesses to certain areas of memory. FIG. 8, for example, shows access frequencies displayed using a histogram. Color-coded areas represents frequent accesses to memory and identifies information that should remain in cache. Frequency access information may also be displayed, for example, as color-coded bumps on a line or bars with height on a plane giving a three-dimensional representation of the memory. Also consistent with the principles of the present invention is a display that shows data dependencies as links between each of the dependent blocks and the blocks from which they depend. A block is dependent on another block when the first block requires the result of the second block for the first block to perform properly within the system. Yet another display could use a variety of colors within a three-dimensional cube that could be rotated.

The present invention may also be used to display and analyze the memory elements of multiple processors in a multiprocessor environment. In a system with multiple processors, each processor executes one or more threads, depending upon the number of processors, to achieve multi-processing of the program. Multithreading is the partitioning of a computer program or application into logically independent "threads" of control that can execute in parallel. Each thread includes a sequence of instructions and data used by the instructions to carry out a particular program task, such as a computation or input/output function. Methods and systems for coordinating the distribution of shared memory to threads of control executing in a parallel computing environment are described in related U.S. patent application Ser. No. 09/244,135, to Shaun Dennie, filed on Feb. 9, 1999, entitled "Protocol for Coordinating the Distribution of Shared Memory," the contents of which are hereby incorporated by reference.

In a multiprocessor parallel environment, such as the one described in Dennie, each thread may be assigned a specific region of a shared memory. To visually display accesses to the entire shared memory in time-sequential order, the trace output file in a multiprocessor environment also must contain information regarding the time of each access.

D. Conclusion

Methods, systems, and articles of manufacture consistent with the present invention thus provide tools for analyzing memory use. By displaying various types of memory accesses graphically, programmers can better understand where large numbers of operations are taking place and then optimize the corresponding sections of the application code to reduce the number of time-consuming memory accesses. By using an outputted trace file and a visualizer program, the programmer can display the memory accesses at various rates, such as forward, backwards, faster, slower, or step-by-step. By displaying information regarding memory use, such as "last read" and "last write," programmers are assisted in developing and optimizing application programs for multiprocessor environments.

Also, methods consistent with the present invention are applicable to all programs for execution in a multiprocessor system regardless of the computer programming language. For example, Fortran 77 is a programming language commonly used to develop programs for execution by multiprocessor computer systems.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems. The scope of the invention is defined by the claims and their equivalents.

What is claimed is:

1. A computer-implemented method of analyzing accesses to a memory by an instrumented application program, comprising:

executing the instrumented application program;

generating, during the execution of the instrumented application program, information reflecting different types of memory access operations; and displaying the generated information in a visual form reflecting the different types of memory access operations using a different visual effect for each type of memory access operation.

2. The method of claim 1, wherein displaying the generated information further comprises:

displaying an array, wherein each cell of the array represents a memory region; and displaying a first cell using a first visual means when the memory region corresponding to the first cell is read.

3. The method of claim 1, wherein displaying the generated information further comprises:

displaying an array, wherein each cell of the array represents a memory region; and displaying a second cell using a second visual means when information is written to the memory region corresponding to the second cell.

4. The method of claim 1, wherein displaying the generated information further comprises:

displaying an array, wherein each cell of the array represents a memory region; and displaying a third cell using a third visual means when information is written to the memory region corresponding to the third cell for the last time in execution of the application.

5. The method of claim 1, wherein displaying the generated information further comprises:

displaying an array, wherein each cell of the array represents a memory region; and displaying a fourth cell using a fourth visual means when information is read from the memory region corresponding to the fourth cell for the last time in execution of the application.

6. The method of claim 1, wherein displaying the generated information further comprises:

displaying an array, wherein each cell of the array represents a memory region; and displaying a fifth cell using a fifth visual means when information is read to and written from the memory region corresponding to the fifth cell in the same operation of the application.

7. An apparatus for tracking accesses to memory in an application, the apparatus comprising:

a memory having program instructions, and a processor configured to use the program instructions to:
execute the instrumented application program;

generate, during the execution of the instrumented application program, information reflecting different types of memory access operations; and display the generated information in a visual form reflecting the different types of memory access operations using a different visual effect for each type of memory access operation.

8. The apparatus of claim 7, wherein the program instruction to display the information includes instructions to:

display an array, wherein each cell of the array represents a memory region; and display a first cell using a first visual means when the memory region corresponding to the first cell is read.

9. The apparatus of claim 7, wherein the program instruction to display the information includes an instruction to:

display an array, wherein each cell of the array represents a memory region; and display a second cell using a second visual means when information is written to the memory region corresponding to the second cell.

10. The apparatus of claim 7, wherein the program instruction to display the information included an instruction to:
   display an array, wherein each cell of the array represents a memory region; and
   display a third cell using a third visual means when information is written to the memory region corresponding to the third cell for the last time in execution of the application.

11. The apparatus of claim 7, wherein the program instruction to display the information includes an instruction to:
   display an array, wherein each cell of the array represents a memory region; and
   display a fourth cell using a fourth visual means when information is read from the memory region corresponding to the fourth cell for the last time in execution of the application.

12. The apparatus of claim 7, wherein the program instruction to display the information includes an instruction to:
   display an array, wherein each cell of the array represents a memory region; and
   display a fifth cell using a fifth visual means when information is read to and written from the memory region corresponding to the fifth cell in the same operation of the application.

13. A computer-readable medium containing instructions for controlling a computer system to perform a method, the computer system having a group of data structures reflecting a logical structure of a data source, the method comprising:
   executing the instrumented application program;
   generating, during the execution of the instrumented application program, information reflecting different types of memory access operations; and
   displaying the generated information in a visual form reflecting the different types of memory access operations using a different visual effect for each type of memory access operation.

14. The computer-readable medium of claim 13, wherein displaying the generated information further comprises:
   displaying an array, wherein each cell of the array represents a memory region; and
   displaying a first cell using a first visual means when the memory region corresponding to the first cell is read.

15. The computer-readable medium of claim 13, wherein displaying the generated information further comprises:
   displaying an array, wherein each cell of the array represents a memory region; and
   displaying a second cell using a second visual means when information is written to the memory region corresponding to the second cell.

16. The computer-readable medium of claim 13, further including:
   displaying an array, wherein each cell of the array represents a memory region; and
   displaying a third cell using a third visual means when information is written to the memory region corresponding to the third cell for the last time in execution of the application.

17. The computer-readable medium of claim 13, further including:
   displaying an array, wherein each cell of the array represents a memory region; and
   displaying a fourth cell using a fourth visual means when information is read from the memory region corresponding to the fourth cell for the last time in execution of the application.

18. The computer-readable medium of claim 13, further including:
   displaying an array, wherein each cell of the array represents a memory region; and
   displaying a fifth cell using a fifth visual means when information is read to and written from the memory region corresponding to the fifth cell in the same operation of the application.

* * * * *